United States Patent
Andrews et al.

(10) Patent No.: US 11,212,274 B2
(45) Date of Patent: Dec. 28, 2021

(54) ACCELERATING OCSP RESPONSES VIA CONTENT DELIVERY NETWORK COLLABORATION

(71) Applicant: DigiCert, Inc., Lehi, UT (US)

(72) Inventors: Richard F. Andrews, Menlo Park, CA (US); Quentin Liu, San Jose, CA (US)

(73) Assignee: DigiCert, Inc., Lehi, UT (US)

( * ) Notice: Subject to any disclaimer, the term of this patent is extended or adjusted under 35 U.S.C. 154(b) by 0 days.

(21) Appl. No.: 16/555,598

(22) Filed: Aug. 29, 2019

(65) Prior Publication Data

US 2020/0127997 A1 Apr. 23, 2020

Related U.S. Application Data

(63) Continuation of application No. 15/851,590, filed on Dec. 21, 2017, now Pat. No. 10,404,681, which is a continuation of application No. 14/050,245, filed on Oct. 9, 2013, now Pat. No. 9,887,982.

(51) Int. Cl.
*H04L 29/06* (2006.01)
*H04L 9/32* (2006.01)
*H04L 29/08* (2006.01)

(52) U.S. Cl.
CPC ........ *H04L 63/0823* (2013.01); *H04L 9/3268* (2013.01); *H04L 63/04* (2013.01); *H04L 67/2842* (2013.01)

(58) Field of Classification Search
CPC ... H04L 63/0823; H04L 9/3268; H04L 63/04; H04L 67/2842
See application file for complete search history.

(56) References Cited

U.S. PATENT DOCUMENTS

| | | | | |
|---|---|---|---|---|
| 6,442,689 | B1 * | 8/2002 | Kocher | H04L 9/3236 |
| | | | | 713/158 |
| 9,678,893 | B2 * | 6/2017 | Botzum | G06F 12/1408 |
| 2002/0029200 | A1 * | 3/2002 | Dulin | G06Q 20/02 |
| | | | | 705/67 |
| 2002/0053023 | A1 * | 5/2002 | Patterson | H04L 63/0823 |
| | | | | 713/156 |
| 2004/0078573 | A1 * | 4/2004 | Matsuyama | H04L 63/061 |
| | | | | 713/175 |

(Continued)

FOREIGN PATENT DOCUMENTS

WO  WO 2014047171  3/2014

OTHER PUBLICATIONS

Ultralight OCSP: Improving Revocation Checking, Feb. 9, 2012, www.digicert.com.

(Continued)

*Primary Examiner* — Tongoc Tran
(74) *Attorney, Agent, or Firm* — Knobbe, Martens, Olson & Bear, LLP

(57) ABSTRACT

Techniques are disclosed for accelerating online certificate status protocol (OCSP) response distribution to relying parties using a content delivery network (CDN). A certificate authority generates updated OCSP responses for OCSP responses cached in the CDN that are about to expire. In addition, the certificate authority pre-generates cache keys in place of CDNs generating the keys. The certificate authority sends the OCSP responses and the cache keys in one transaction, and the CDN, in turn, consumes the new OCSP responses using the cache keys.

20 Claims, 7 Drawing Sheets

(56) References Cited

U.S. PATENT DOCUMENTS

| | | | |
|---|---|---|---|
| 2004/0093493 A1* | 5/2004 | Bisbee | G07F 7/08 |
| | | | 713/156 |
| 2005/0114666 A1* | 5/2005 | Sudia | H04L 9/3247 |
| | | | 713/175 |
| 2005/0148323 A1* | 7/2005 | Little | H04L 63/0823 |
| | | | 455/414.1 |
| 2005/0172128 A1* | 8/2005 | Little | H04L 51/00 |
| | | | 713/168 |
| 2005/0188048 A1* | 8/2005 | Yuan | H04L 69/329 |
| | | | 709/208 |
| 2005/0193204 A1* | 9/2005 | Engberg | H04L 9/3247 |
| | | | 713/175 |
| 2005/0228999 A1* | 10/2005 | Jerdonek | H04L 9/3268 |
| | | | 713/176 |
| 2008/0133907 A1* | 6/2008 | Parkinson | H04L 63/101 |
| | | | 713/158 |
| 2008/0183851 A1* | 7/2008 | Puthupparambil | H04L 63/0823 |
| | | | 709/223 |
| 2009/0013177 A1* | 1/2009 | Lee' | H04L 63/10 |
| | | | 713/158 |
| 2009/0144540 A1* | 6/2009 | Davis | G06F 21/35 |
| | | | 713/156 |
| 2010/0023759 A1* | 1/2010 | Langer | H04L 9/302 |
| | | | 713/156 |
| 2010/0223470 A1* | 9/2010 | Lord | H04L 9/3263 |
| | | | 713/175 |
| 2011/0074788 A1 | 3/2011 | Regan et al. | |
| 2011/0154017 A1* | 6/2011 | Edstrom | H04L 67/2819 |
| | | | 713/151 |
| 2011/0161663 A1* | 6/2011 | Nakhjiri | H04L 63/0823 |
| | | | 713/158 |
| 2013/0156189 A1* | 6/2013 | Gero | H04L 9/0838 |
| | | | 380/255 |
| 2014/0222446 A1 | 8/2014 | Ash et al. | |
| 2015/0012297 A1 | 1/2015 | Ash et al. | |

OTHER PUBLICATIONS

Tiemann, Paul:,"Scaling OCSP via DNS", Apr. 29, 2011, https://groups.goodle.com/forum/#!msg/mozilla,dev.security policy/pfFLvTFZxE8/cXVZ3r1 u4UOJ.

Prince, Matthew; "OCSP Stapling: How Cloudftare Just Made SSL 30% Faster"; Oct. 29, 2012; http://blogcloudflare.com/ocsp stapling how cludflare just made ssl 30/.

Pala, Massimiliano; Rea, Scott;"OCSP over DNS", Aigist 1. 2012; www.digicert.com.

U.S. Appl. No. 14/135,277, entitled "Reducing Latency for Certificate Validity Messages Using Private Content Delivery Networks", filed Dec. 19, 2013.

Pala et al., "OCSP over DNS", Jul. 2012, pp. 1-7 https://tools.ietf.Org/html/draft-pala-rea-ocsp-over-dns- OO#page-3.

International Search Report and Written Opinion for PCT/US2016/029178 dated Jul. 19, 2016.

\* cited by examiner

ACCELERATING OCSP RESPONSES VIA CONTENT DELIVERY NETWORK COLLABORATION

PRIORITY CLAIM

This application is a continuation of U.S. patent application Ser. No. 15/851,590, filed Dec. 21, 2017, entitled "Accelerating OCSP Responses Via Content Delivery Network Collaboration," which is a continuation of U.S. patent application Ser. No. 14/050,245, filed Oct. 9, 2013, entitled "Accelerating OCSP Responses Via Content Delivery Network Collaboration," each of which is hereby incorporated by reference herein in its entirety and for all purposes.

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field

Embodiments presented herein generally relate to techniques for computer security. More specifically, techniques are disclosed for increasing the performance of online certificate status protocol responses to relying parties using a content delivery network.

Description of the Related Art

Online certificate status protocol (OCSP) is a method of delivering a status of a digital certificate to a relying party. When an OCSP request for a certificate is received, a certificate authority sends a digitally signed OCSP response to the relying party. Such a response indicates whether the certificate is valid, invalid, revoked, etc. Once signed, an OCSP response is valid and correct for a specified period of time, e.g., seven days, or until the certificate is revoked.

A large commercial certificate authority may issue thousands, or even millions, of certificates. In such cases, it may be impractical for a certificate authority to send OCSP responses to relying parties directly. Instead, the certificate authority may rely on a content delivery network (CDN) as a front-end distributor of OCSP responses. As is known, web services use CDNs to distribute content to end-users with high availability and performance. CDNs may include computer servers deployed in multiple locations to reduce bandwidth costs, page load times, and increase the availability of content. Upon receiving content from an origin server for distribution to an end-user, a server caches the content before sending it to the end-user. Because the content provided by CDNs is typically static or otherwise slowly-changing, certificate authorities are able to adopt the CDN to distribute the OCSP responses to relying parties.

However, current approaches by certificate authorities using CDNs to distribute responses raise several concerns. For example, although OCSP responses may remain valid for a certain period of time, a certificate authority may revoke the underlying certificate before the certificate expires. Because CDNs cache OCSP responses ahead of time, the OCSP response on the CDN may still indicate that the certificate is valid despite the certificate authority indicating otherwise (i.e., the OCSP response on the CDN servers is incorrect). Another concern is that when a signed OCSP response expires, the CDN removes the response from the cache and a relying party must then retrieve an updated OCSP response from the origin server of the CDN, which can degrade response times.

SUMMARY

One embodiment presented herein includes a method for distributing certificate validity messages to a content delivery network (CDN). The method generally includes identifying, via a processor, a set of validity messages to update. The method generally also includes generating, for each certificate validity message in the set, an updated certificate validity message to replace each certificate validity message. The method generally also includes generating, for each updated certificate validity message, an associated cache key. The CDN uses the cache key to store the updated certificate validity message into a cache. The method generally also includes sending the updated certificate validity messages and associated cache keys to the CDN.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

Note, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Embodiments presented herein provide techniques for accelerating the distribution of online certificate status protocol (OCSP) responses to relying parties via a content delivery network (CDN). The techniques disclosed herein reduce the amount of time required for a relying party to receive an OCSP response from a certificate authority. In one embodiment, the certificate authority generates updated OCSP responses for multiple OCSP responses that are about to expire (or certificates that have been revoked). In addition, the certificate authority generates cache keys for each updated OCSP response using an algorithm provided by the CDN. Rather than wait for the CDN to request updated OCSP responses from the certificate authority (i.e., after the OSCP responses expire), the certificate authority sends the OCSP responses along with the corresponding cache keys. Further, the responses and keys may be sent in the aggregate as a single transaction. The CDN updates the OCSP responses using the cache keys, allowing for fast retrieval of the OCSP responses from the CDN cache.

In addition, the CDN may send the certificate authority data indicating a frequency of requests for different OSCP responses (e.g., through a cache utilization measure). For example, in some situations, CDNs may be unable to cache every OCSP response for large certificate authorities. Further, a majority of relying parties may be requesting an OCSP response for a small percentage of the certificate authority's overall certificates. Therefore, rather than send OSCP responses for all certificates managed by the certificate authority, the certificate authority sends the CDN OSCP responses for the most highly-requested certificates.

Sending the CDN multiple updated OCSP responses and cache keys allows the CDN to deliver responses to relying parties more quickly. That is, this approach requires less effort by the CDN to obtain updated OCSP responses. For instance, rather than a CDN waiting for a certificate to expire and requesting an updated version from the certificate authority, the certificate authority instead sends the updated response before it is first needed. This approach minimizes the window of time that the CDN sends stale or incorrect OCSP responses to a relying party and also eliminates the need for a relying party to retrieve the OCSP response from the origin server of the CDN after the OCSP response expires. Further, rather than send separate updated responses to the CDN, the certificate authority sends whatever updated responses are available in one transaction. Further still, the CDN also does not have to generate cache keys because the certificate authority has already pre-generated the cache keys. Doing so reduces the time required to process multiple OCSP responses to the CDN cache.

Figure 1:
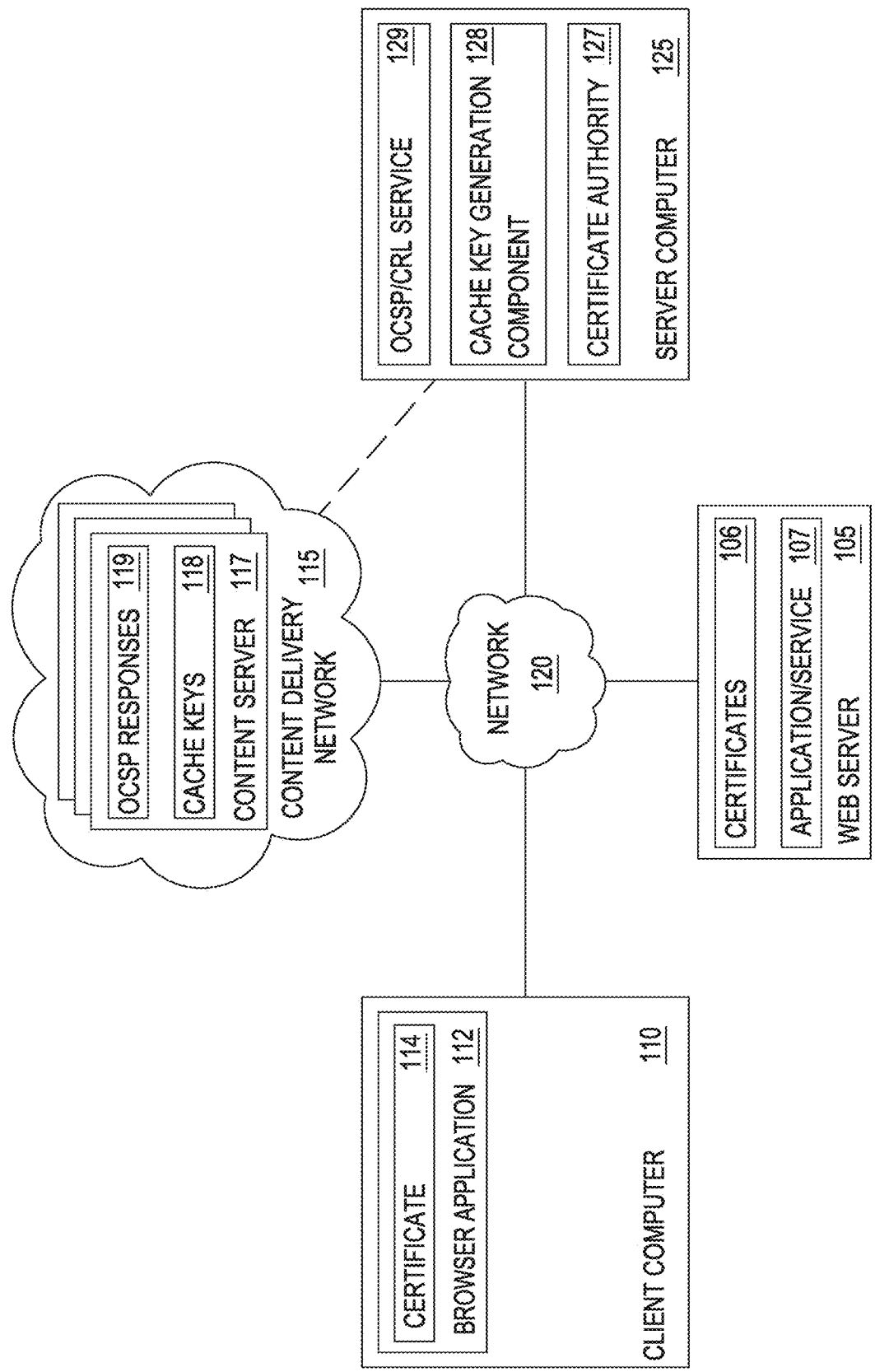
FIG. 1 illustrates an example computing environment, according to one embodiment.

FIG. 1 illustrates an example computing environment 100, according to one embodiment. As shown, the computing environment 100 includes a web server 105 hosting a computing resource (e.g., application/service 107). The server computer 105 may be a physical computing system (e.g., a system in a data center) or may be a virtual computing instance executing within a computing cloud. In any event, the computing system 105 hosts an application/service 107 accessed by clients using computing system 110. For example, web server 105 may be owned and operated by a company providing a service to client computers 110, such as an online banking service. Client computers access the service using a browser application 112. When engaging in secure transactions with client computer 110, web server 105 may present digital certificates 106 to client computer 110, and in turn, the client computer may store a certificate 114 in the cache of browser application 112.

Computing environment 100 also includes a server computer 125 that manages and issues digital certificates to customers (e.g., the bank described above using a web server 105). Server computer 125 includes a certificate authority 127, an online certificate status protocol/certificate revocation list (OCSP/CRL) service 129, and a cache key generation component 128. A client computer 110 verifies the validity of certificate 114 by sending an OCSP request to certificate authority 127. Certificate authority 127 identifies whether certificate 127 is valid (or revoked) by using the OCSP/CRL service 129. Server computer 125 sends the result to client computer 110 as an OSCP response that indicates whether certificate 114 is valid, invalid, revoked, etc. Certificate authority 127 digitally signs each OCSP response. Once signed, an OCSP response is valid for a certain period of time, e.g., for seven days, or until certificate authority 127 revokes the underlying certificate.

In some situations, server computer 105 may manage millions of digital certificates and delegate the distribution of OCSP responses to a content delivery network (CDN) 115. CDN 115 may include multiple content servers 117 that store OCSP responses 119 generated and sent to CDN 115 by server computer 125. Generally, upon receiving an OCSP response 119 from server computer 125, CDN 115 generates a cache key 118 for the OCSP response 119. A cache key 118 is a unique key that allows CDN 115 to identify content served by the CDN, in the present context, an OCSP response 119. CDN 115 uses the cache key to retrieve the OCSP response 119 from the cache in response to OCSP requests.

Generally, when an OCSP response 119 expires, CDN 115 may request an updated OCSP response from the certificate authority 127. In one embodiment, however, server computer 125 may generate updated responses for the OCSP responses that are soon expiring (or have been revoked by OCSP/CRL service 129) and send multiple updated OCSP responses to CDN 115 in one transaction. Further, in one embodiment, CDN 115 provides an algorithm for generating the cache keys 118. Doing so allows server computer 125 (through cache key generation component 128) to generate cache keys 118 to send to CDN 115. Doing so reduces the time required by CDN 115 to process and cache OCSP responses 119 across content servers 117.

Figure 2:
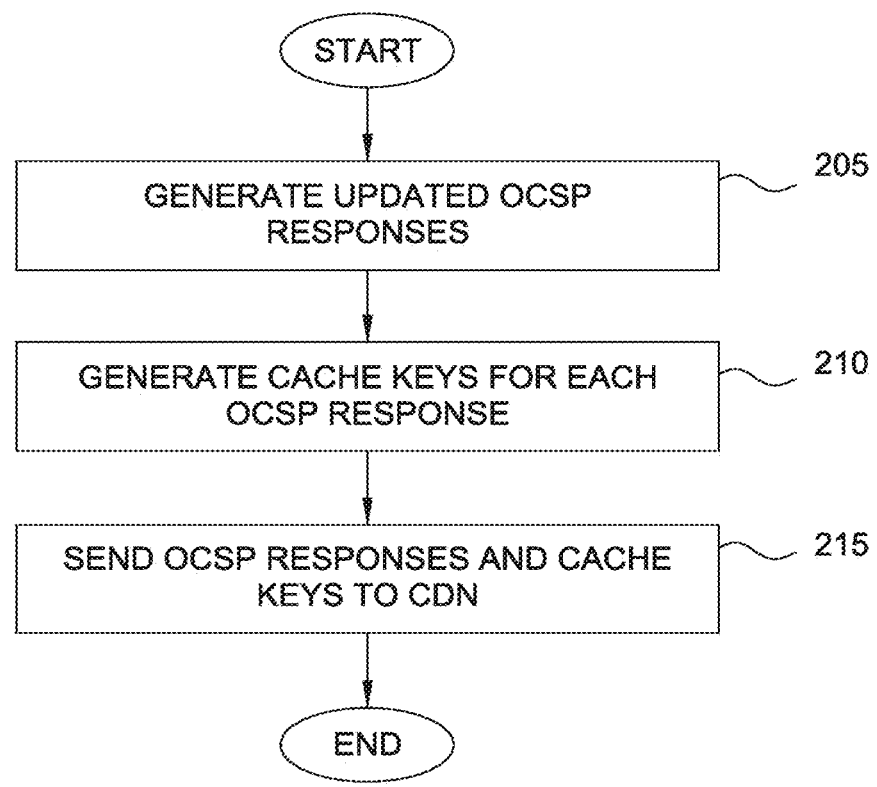
FIG. 2 illustrates a method for distributing online certificate status protocol (OCSP) responses to a content delivery network (CDN), according to one embodiment.

FIG. 2 illustrates a method 200 for distributing updated OCSP responses to a CDN, according to one embodiment. As stated, the certificate authority generates a collection of OCSP responses and sends them the CDN before such OCSP responses expire. As shown, method 200 begins at step 205, where the certificate authority generates updated OCSP responses for the responses that are about to expire or for certificates that have been revoked. The batch of generated OCSP responses may correspond to the certificates of numerous organizations (e.g., a certificate from bank A, a certificate from bank B, a certificate from merchant X, etc.). Note, the period before the responses expire may be set as a matter of preference, but two days before expiration has proven to be a reasonable amount of time.

At step 210, the certificate authority generates a cache key corresponding to each OCSP response. To generate the cache keys, the certificate authority may use a key generation algorithm agreed upon with the CDN provider (e.g., an algorithm used by the CDN itself to generate such keys). At step 215, the certificate authority sends the OCSP responses and cache keys to the CDN. The CDN receives the OCSP responses and stores each OCSP response in the cache.

Figure 3:
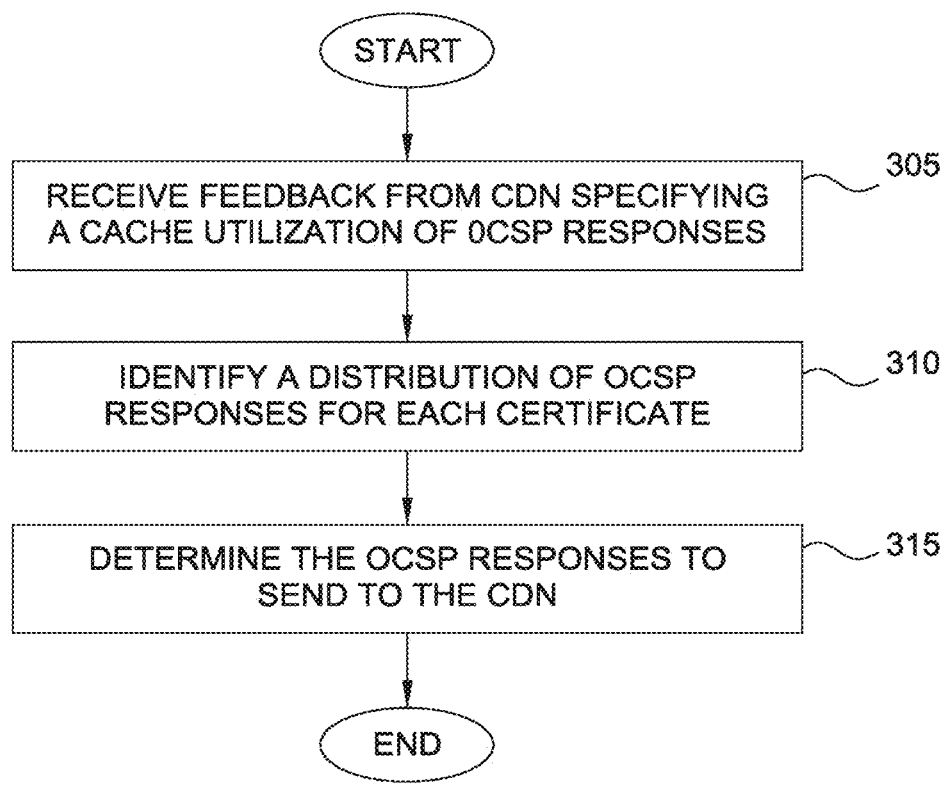
FIG. 3 illustrates a method for further optimizing the distribution of updated OCSP responses to a CDN for highly requested certificates, according to one embodiment.

This approach also reduces the window of time that a CDN sends stale OCSP responses to relying parties. For example, assume that a certificate authority sends an OCSP response for a certificate A, and the OCSP response is valid for seven days. Further assume that the certificate authority revokes certificate A on the second day. In this case, to prevent the CDN from distributing the older response to a relying party (and then retrieving the updated OCSP from the CDN before the response expires), the certificate authority generates the updated OCSP response and proactively sends the response to the CDN. FIG. 3 illustrates a method 300 for further optimizing the distribution of updated OCSP responses to a CDN described in method 200, according to one embodiment. In the case of a large certificate authority, a CDN might be unable to efficiently cache and distribute OCSP responses for each certificate. Therefore, in one embodiment, the certificate authority may send OSCP responses (and corresponding CDN cache keys) for the most frequently requested certificates.

As shown, method 300 begins at step 305, where the certificate authority receives feedback from the CDN. The feedback may specify a cache utilization measure of OCSP responses sent to relying parties. For example, the cache utilization measure may be determined from the actual requests received from relying parties (e.g., requests received over a week, month, etc.).

At step 310, the certificate authority identifies a distribution of OCSP responses sent for each certificate. For example, the distribution may indicate that 90% of OCSP requests correspond to 15% of the certificates managed by the certificate authority. At step 315, the certificate authority determines which OCSP updates to generate and send to the CDN. For instance, the certificate authority may decide to send OCSP responses for the 15% of the certificates managed by the CA. Once identified, the certificate authority sends OCSP responses for those certificates as described above.

Under this approach, the OCSP response cache entries for less frequently requested certificates (i.e., the ones not being sent in advance) expire at the CDN. When the CDN receives a request corresponding to an expired OCSP response, the CDN retrieves and re-caches the OCSP response from the certificate authority.

Figure 4:
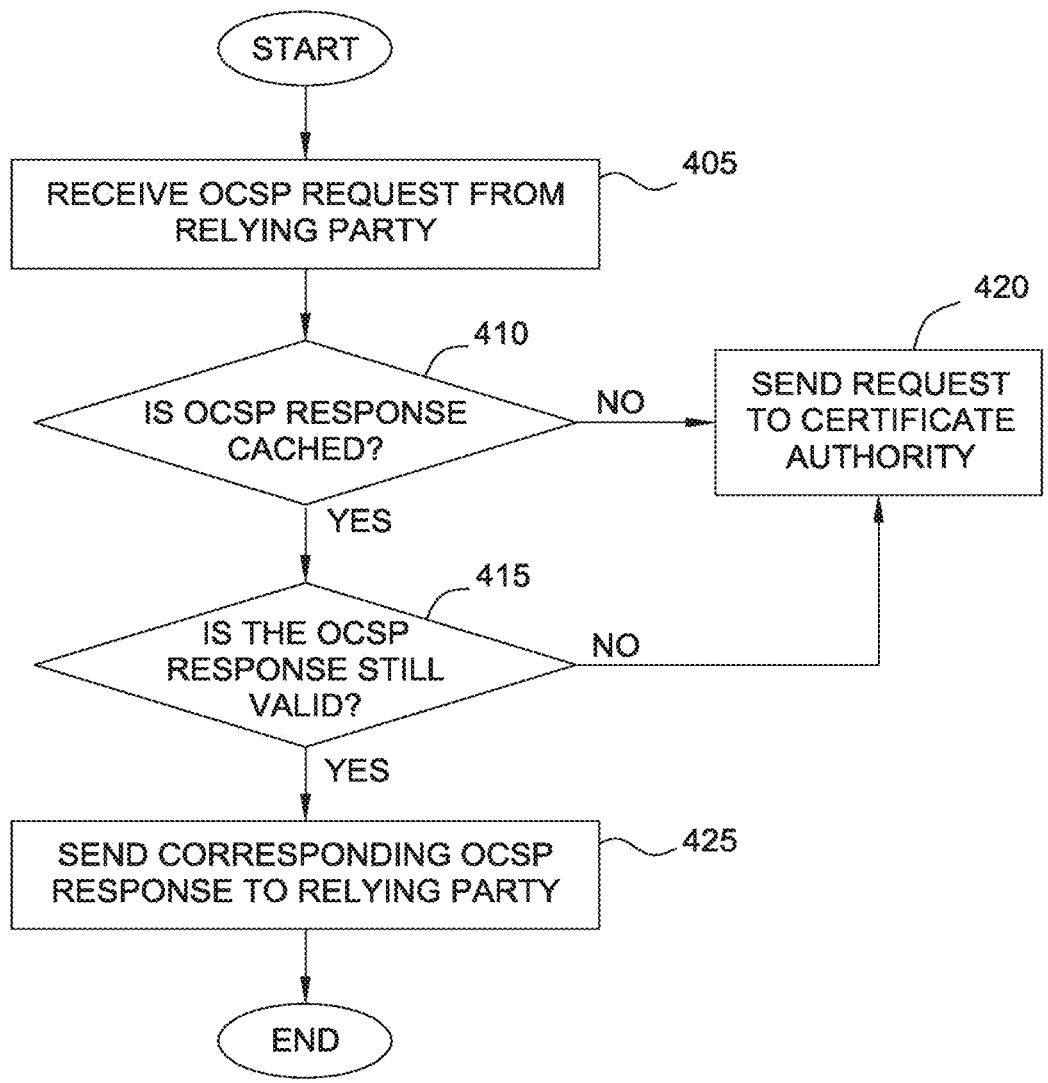
FIG. 4 illustrates a method for processing OCSP requests to the CDN made by a relying party, according to one embodiment.

FIG. 4 illustrates a method 400 for handling OCSP requests in the CDN, according to one embodiment. More specifically, method 400 illustrates the approach where the certificate authority sends updated OCSP responses for the most frequently requested certificates. As shown, method 400 begins at step 405, where a content server in a CDN receives an OCSP request from a relying party. A relying party may be a web browser application that has received a digitally signed certificate from a web server. When the content server receives the OCSP request, the content server determines whether the OCSP response corresponding to the underlying certificate is cached in the CDN (step 410).

At step 415, if the OCSP response is cached in the CDN, then the content server determines whether the OCSP response is still valid (i.e., not expired). If so, the CDN (through the content server storing the OCSP response) sends the OCSP response to the relying party (step 425). However, if the OCSP response is not valid (or not cached), then the content server sends the request to the certificate authority (at step 420) and retrieves a valid OCSP response. Step 420 may be performed for a less frequently requested certificate, after one OCSP response has expired. When the CDN receives the updated OCSP response, the CDN generates a cache key for the OCSP response and migrates the OCSP response through the content servers.

Figure 5:
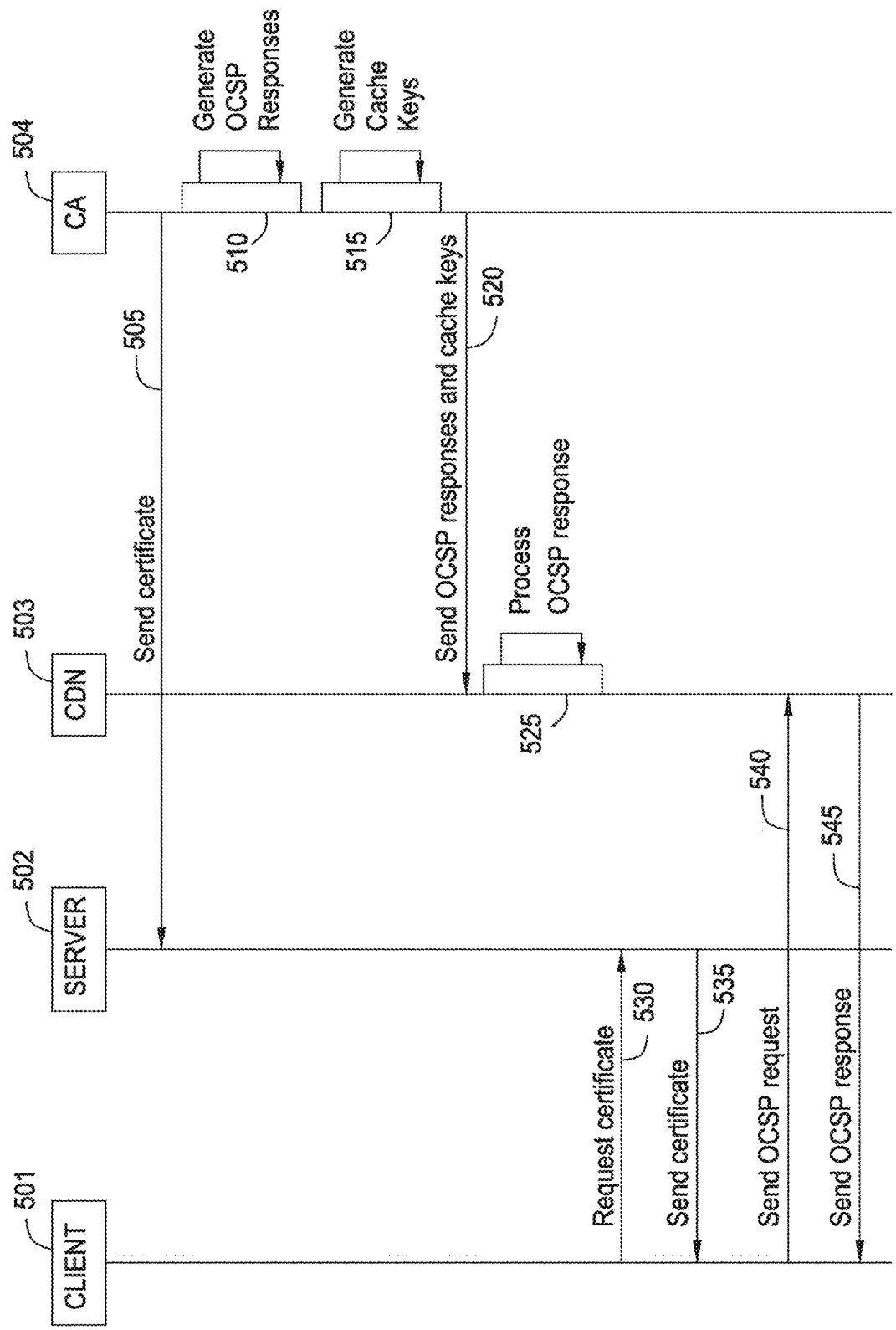
FIG. 5 illustrates a sequence diagram for accelerating the distribution of OCSP responses to a relying party using a CDN, according to one embodiment.

FIG. 5 illustrates a sequence diagram 500 for accelerating the distribution of OCSP responses to a relying party (e.g., a client 501) using a CDN 503, according to one embodiment. As shown, a certificate authority 504 sends a certificate to a web server 502 (at 505). Certificate authority 404 generates updated OCSP responses (at 510). For example, certificate authority 404 may do so for certificates that have been revoked or for OCSP responses that are about to expire. As the OCSP responses are generated, certificate authority 404 generates cache keys for each response (at 515). As stated, the pre-computation of such keys allows CDN 503 to quickly process the updated OCSP responses upon receipt. After generating the batch of updated OCSP responses and corresponding cache keys, certificate authority 504 sends the OCSP responses and cache keys to CDN 503. CDN 503 and caches the OCSP responses using the cache keys (at 525).

At 530, a relying party (e.g., client 501) requests a certificate from server 502. Server 502 sends the certificate to client 501 (at 535). At 540, the client 501 sends an OCSP request to CDN 503 to determine whether the certificate sent from the server is valid. In response, the CDN 503 determines whether the corresponding OCSP response is stored in the network. If so, the cache key provided by certificate authority 504 allows the CDN to quickly identify where the OCSP response is located. And once identified, at 545, CDN 503 sends the OCSP response to client 501.

Figure 6:
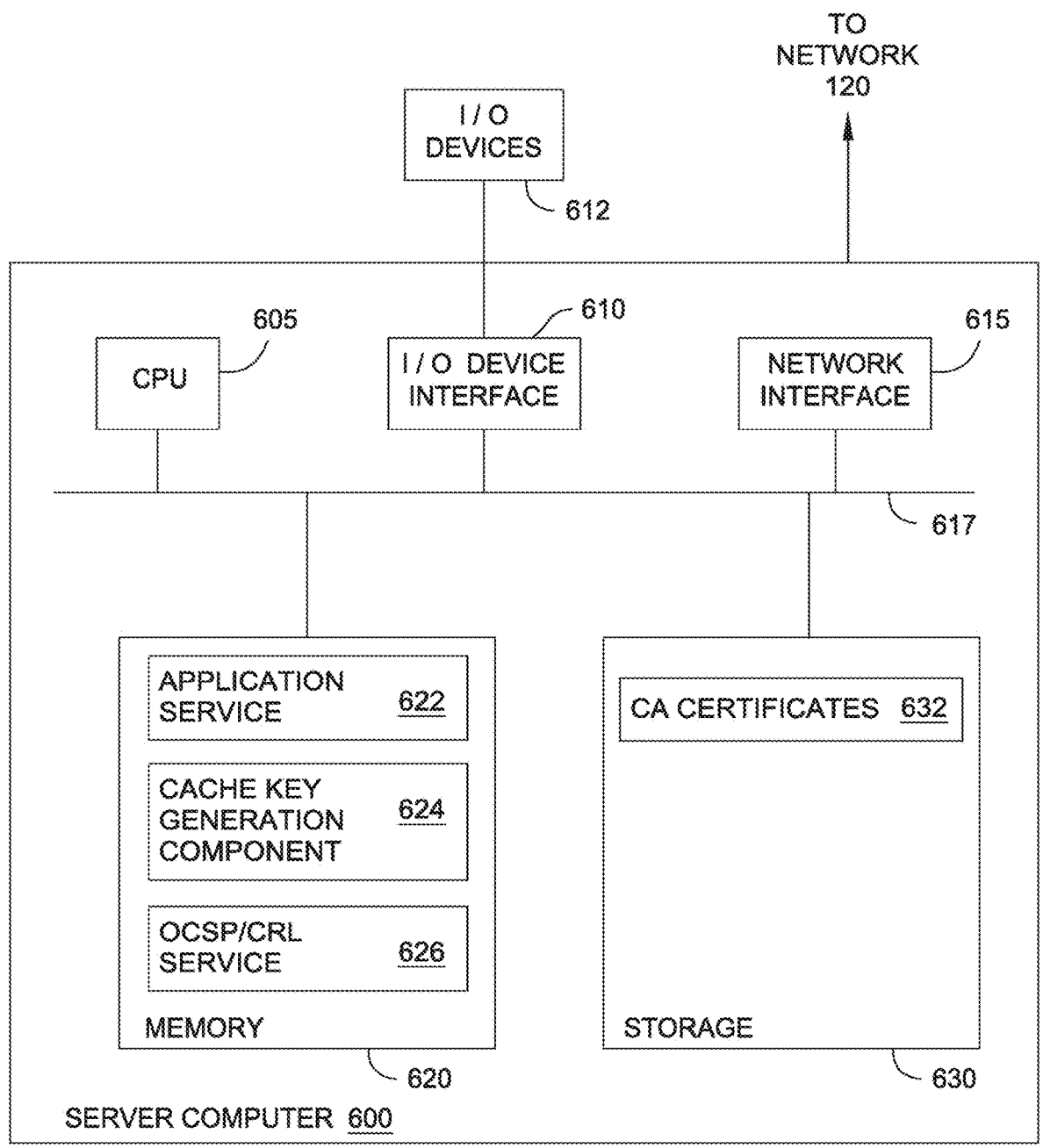
FIG. 6 illustrates an example computing system configured to generate OCSP responses and cache keys to distribute to a CDN, according to one embodiment.

FIG. 6 illustrates an example computing system 600 configured to generate OCSP responses and cache keys to distribute to a CDN, according to one embodiment. As shown, computing system 600 includes, without limitation, a central processing unit (CPU) 605, a network interface 615, a network interface 615, a memory 620, and storage 630, each connected to a bus 617. Computing system 600 may also include an I/O device interface 610 connecting I/O devices 612 (e.g., keyboard, display and mouse devices) to the computing system 600. Further, in context of this disclosure, the computing elements shown in computing system 600 may correspond to a physical computing system (e.g., a system in a data center) or may be a virtual computing instance executing within a computing cloud.

CPU 605 retrieves and executes programming instructions stored in memory 620 as well as stores and retrieves application data residing in the memory 630. The interconnect 617 is used to transmit programming instructions and application data between CPU 605, I/O devices interface 610, storage 630, network interface 615, and memory 620. Note, CPU 605 is included to be representative of a single CPU, multiple CPUs, a single CPU having multiple processing cores, and the like. Memory 620 is generally included to be representative of a random access memory. Storage 630 may be a disk drive storage device. Although shown as a single unit, storage 630 may be a combination of fixed and/or removable storage devices, such as fixed disc drives, removable memory cards, or optical storage, network attached storage (NAS), or a storage area-network (SAN).

Illustratively, memory 620 includes an application/service 622, an OCSP/CRL service 626, and a cache key generation component 624. Storage 630 includes one or more certificates 632. Application/service 622 generally provides one or more software applications and/or computing resources accessed over a network 120. OCSP/CRL service 626 generates OCSP responses based on certificates 632 to send to a CDN. Further, OCSP/CRL service 626 maintains a list of revoked certificates 632. When one of the certificates 632 is revoked or a certain OCSP response issued to a CDN is about to expire, OCSP/CRL service 626 generates updated OCSP responses and sends the responses to the CDN. As OCSP/CRL service 626 generates each OCSP response, cache key generation component computes cache keys using an algorithm provided by the CDN (e.g., such as one used by the CDN to compute its own cache keys).

Figure 7:
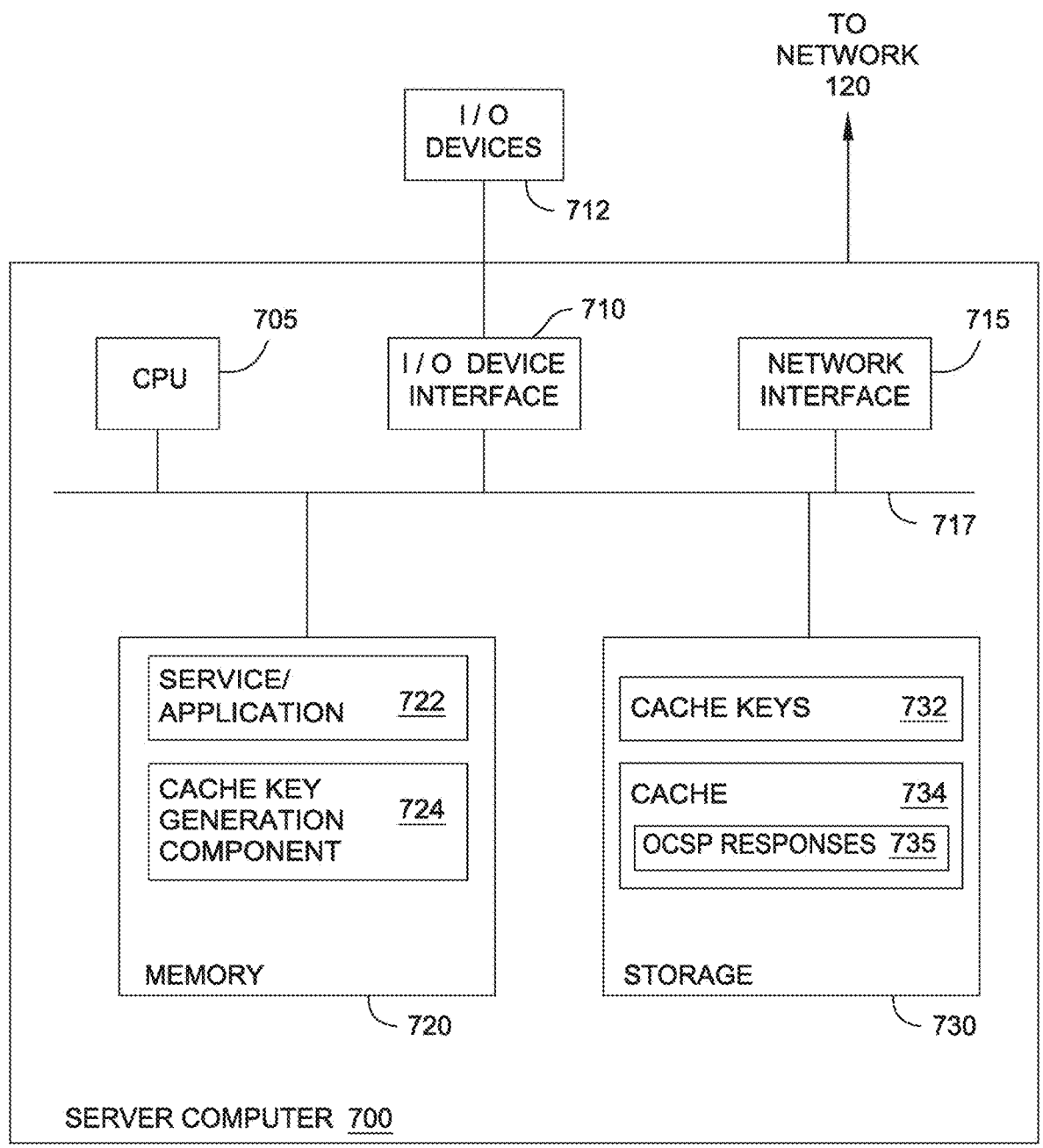
FIG. 7 illustrates an example computing system configured to receive updated OCSP responses and cache keys for each response, according to one embodiment.

FIG. 7 illustrates an example computing system 700 configured to receive updated OCSP responses and cache keys for each response, according to one embodiment. As shown, computing system 700 includes, without limitation, a central processing unit (CPU) 705, a network interface 715, a network interface 715, a memory 720, and storage 730, each connected to a bus 717. Computing system 700 may also include an I/O device interface 710 connecting I/O devices 712 (e.g., keyboard, display and mouse devices) to computing system 700. Further, in context of this disclosure, the computing elements shown in computing system 700 may correspond to a physical computing system (e.g., a system in a data center) or may be a virtual computing instance executing within a computing cloud.

CPU 705 retrieves and executes programming instructions stored in memory 720 as well as stores and retrieves application data residing in the memory 730. Interconnect 717 is used to transmit programming instructions and application data between CPU 705, I/O devices interface 710, storage 730, network interface 715, and memory 720. Note, CPU 705 is included to be representative of a single CPU, multiple CPUs, a single CPU having multiple processing cores, and the like. Memory 720 is generally included to be representative of a random access memory. Storage 730 may be a disk drive storage device. Although shown as a single unit, storage 730 may be a combination of fixed and/or removable storage devices, such as fixed disc drives, removable memory cards, or optical storage, network attached storage (NAS), or a storage area-network (SAN).

Illustratively, memory 720 includes an application/service 722 and a cache key generation component 724. Storage 730 includes one or more cache keys 732 and a cache 734. Cache 734 itself includes one or more OCSP responses 735. The application/service 722 generally provides one or more software applications and/or computing resources accessed over a network 120. Application/service 722 receives OCSP responses 735 and cache keys 732 from a certificate authority and stores OCSP responses 735 using cache keys 732. In the case where the certificate authority only sends the most frequently requested OCSP responses to server computer 700, server computer 700 allows OCSP responses 735 for the less frequently requested OCSP responses to expire. When a relying party requests an expired OCSP response, server computer 700 (e.g., through application/service 722) retrieves the up-to-date OCSP response from the certificate authority, generates a cache key 732 (using cache key generation component 724), and stores the OCSP response in cache 734.

In the preceding, reference is made to embodiments of the invention. However, the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

Embodiments of the present disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources. A user can access any of the resources that reside in the cloud at any time, and from anywhere across the Internet.

As described, embodiments presented herein provide techniques for accelerating the distribution of OCSP responses to a relying party via a CDN. A certificate authority sends a batch of OCSP responses along with pre-generated cache keys for each response to the CDN. Advantageously, the pre-generated cache keys allow the CDN to more quickly process and retrieve the OCSP responses in the cache. Accordingly, embodiments provide process that allows relying parties to more quickly obtain OCSP responses for certificates after sending a request to the certificate authority.

In view of the foregoing, the scope of the present disclosure is determined by the claims that follow.

What is claimed is:

1. A computer-implemented method for distributing certificate validity messages to a content delivery network (CDN) computing device, the computer-implemented method comprising:
generating, at a certificate authority (CA) computing device separate from the CDN computing device, a plurality of certificate validity messages;
identifying, at the CA computing device, a CDN cache key algorithm corresponding to a cache of the CDN computing device;
generating, at the CA computing device, a plurality of CDN cache keys using the CDN cache key algorithm; and
transmitting, from the CA computing device to the CDN computing device, at least one certificate validity message of the plurality of certificate validity messages and at least one CDN cache key of the plurality of CDN cache keys, wherein the CDN computing device uses the at least one CDN cache key to store the at least one certificate validity message in the cache.

2. The computer-implemented method of claim 1, further comprising identifying a set of certificate validity messages that expire within a certain time period, wherein the plurality of certificate validity messages is generated based at least in part on the set of certificate validity messages.

3. The computer-implemented method of claim 1, further comprising identifying a set of certificates that at least one of have been revoked or expire within a certain time period, wherein the plurality of certificate validity messages is generated based at least in part on the set of certificates.

4. The computer-implemented method of claim 1, further comprising identifying a set of certificates for which a respective status has been requested by one or more client computing devices at least a threshold number of times, wherein the plurality of certificate validity messages is generated based at least in part on the set of certificates.

5. The computer-implemented method of claim 1, wherein said identifying the CDN cache key algorithm, comprises:
receiving the CDN cache key algorithm from the CDN computing device.

6. The computer-implemented method of claim 1, wherein each of the plurality of certificate validity messages is an online certificate status protocol (OCSP) response.

7. The computer-implemented method of claim 1, further comprising, transmitting, from the CA computing device to the CDN computing device, the plurality of certificate validity messages and the plurality of CDN cache keys to the CDN computing device, wherein the CDN computing device uses the plurality of CDN cache keys to store the plurality of certificate validity messages in the cache.

8. Non-transitory computer-readable storage media storing instructions, which, when executed by one or more processors of a certificate authority (CA) computing device separate from a content delivery network (CDN) computing device, cause the one or more processors to:
generate a plurality of certificate validity messages;
identify a CDN cache key algorithm corresponding to a cache of the CDN computing device;
generate a plurality of CDN cache keys using the CDN cache key algorithm; and
transmit, to the CDN computing device, at least one certificate validity message of the plurality of certificate validity messages and at least one CDN cache key of the plurality of CDN cache keys, wherein the CDN computing device uses the at least one CDN cache key to store the at least one certificate validity message in the cache.

9. The non-transitory computer-readable storage media of claim 8, wherein the instructions further cause the one or more processors to identify a set of certificate validity messages that expire within a certain time period, wherein the plurality of certificate validity messages is generated based at least in part on the set of certificate validity messages.

10. The non-transitory computer-readable storage media of claim 8, wherein the instructions further cause the one or more processors to identify a set of certificates that at least one of have been revoked or expire within a certain time period, wherein the plurality of certificate validity messages is generated based at least in part on the set of certificates.

11. The non-transitory computer-readable storage media of claim 8, wherein the instructions further cause the one or more processors to identify a set of certificates for which a respective status has been requested by one or more client computing devices at least a threshold number of times, wherein the plurality of certificate validity messages is generated based at least in part on the set of certificates.

12. The non-transitory computer-readable storage media of claim 8, wherein, to identify the CDN cache key algorithm, the instructions further cause the one or more processors to:
receive the CDN cache key algorithm from the CDN computing device.

13. The non-transitory computer-readable storage media of claim 8, wherein each of the plurality of certificate validity messages is an online certificate status protocol (OCSP) response.

14. The non-transitory computer-readable storage media of claim 8, wherein the instructions further cause the one or more processors to transmit, to the CDN computing device, the plurality of certificate validity messages and the plurality of CDN cache keys to the CDN computing device, wherein the CDN computing device uses the plurality of CDN cache keys to store the plurality of certificate validity messages in the cache.

15. A system, comprising:
one or more processors of a certificate authority (CA) computing device that is separate from a content delivery network (CDN) computing device, the one or more processors configured to:
generate a plurality of certificate validity messages;
identify a CDN cache key algorithm corresponding to a cache of the CDN computing device;
generate a plurality of CDN cache keys using the CDN cache key algorithm; and transmit, to the CDN computing device, at least one certificate validity message of the plurality of certificate validity messages and at least one CDN cache key of the plurality of CDN cache keys, wherein the CDN computing device uses the at least one CDN cache key to store the at least one certificate validity message in the cache.

16. The system of claim 15, wherein the one or more processors are further configured to identify a set of certificate validity messages that expire within a certain time period, wherein the plurality of certificate validity messages is generated based at least in part on the set of certificate validity messages.

17. The system of claim 15, wherein the one or more processors are further configured to identify a set of certificates that at least one of have been revoked or expire within a certain time period, wherein the plurality of certificate validity messages is generated based at least in part on the set of certificates.

18. The system of claim 15, wherein the one or more processors are further configured to identify a set of certificates for which a respective status has been requested by one or more client computing devices at least a threshold number of times, wherein the plurality of certificate validity messages is generated based at least in part on the set of certificates.

19. The system of claim 15, wherein to identify the CDN cache key algorithm, the one or more processors are configured to:

receive the CDN cache key algorithm from the CDN computing device.

20. The system of claim 15, wherein each of the plurality of certificate validity messages is an online certificate status protocol (OCSP) response.

* * * * *